United States Patent [19]

Kiel

[11] Patent Number: 4,784,083
[45] Date of Patent: Nov. 15, 1988

[54] FOIL PACKAGE AND METHOD FOR PRODUCING SAME

[75] Inventor: Hans R. Kiel, Verden, Fed. Rep. of Germany

[73] Assignee: Effem GmbH, Fed. Rep. of Germany

[21] Appl. No.: 931,748

[22] PCT Filed: Feb. 11, 1986

[86] PCT No.: PCT/DE86/00047
§ 371 Date: Oct. 31, 1986
§ 102(e) Date: Oct. 31, 1986

[87] PCT Pub. No.: WO86/04777
PCT Pub. Date: Aug. 28, 1986

[30] Foreign Application Priority Data

Feb. 13, 1985 [DE] Fed. Rep. of Germany ....... 3504798
Nov. 8, 1985 [DE] Fed. Rep. of Germany ....... 3539637
Feb. 6, 1986 [EP] European Pat. Off. ........ 86101553.5

[51] Int. Cl.⁴ ............................................... A01K 1/00
[52] U.S. Cl. ...................................................... 119/1
[58] Field of Search ............................................ 119/1

[56] References Cited

U.S. PATENT DOCUMENTS

| | | | |
|---|---|---|---|
| 3,084,843 | 4/1963 | Urban | 229/126 X |
| 3,227,137 | 1/1966 | Goldman et al. | 119/1 |
| 4,279,217 | 7/1981 | Behringer | 119/1 |
| 4,299,190 | 11/1981 | Rhodes | 119/1 |

Primary Examiner—Robert Peshock
Attorney, Agent, or Firm—Curtis, Morris & Safford

[57] ABSTRACT

A composite foil package for a pourable material such as cat litter having an outer hull and inner lining sealed to provide an interior space to retain the pourable material. The hull and lining are provided with perforations to permit, when the perforations are parted, the folding out of the outer hull and inner lining to expose the pourable material.

3 Claims, 5 Drawing Sheets

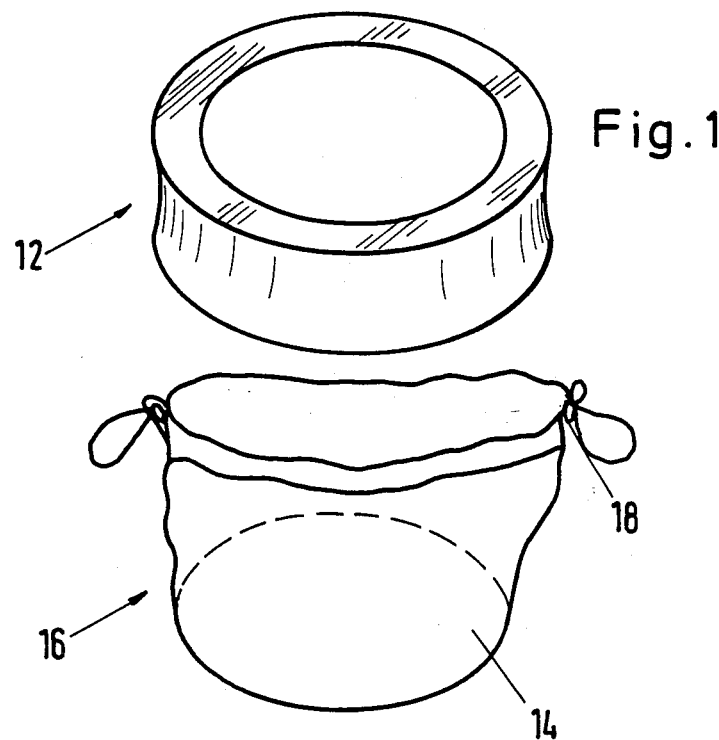
Fig.1
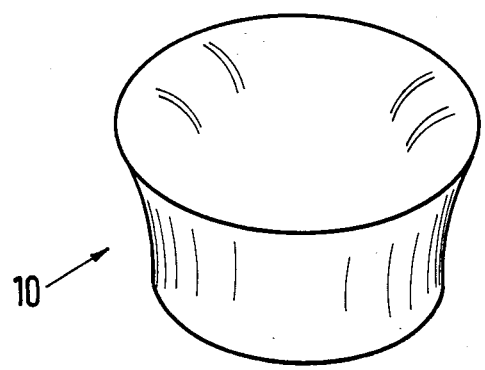

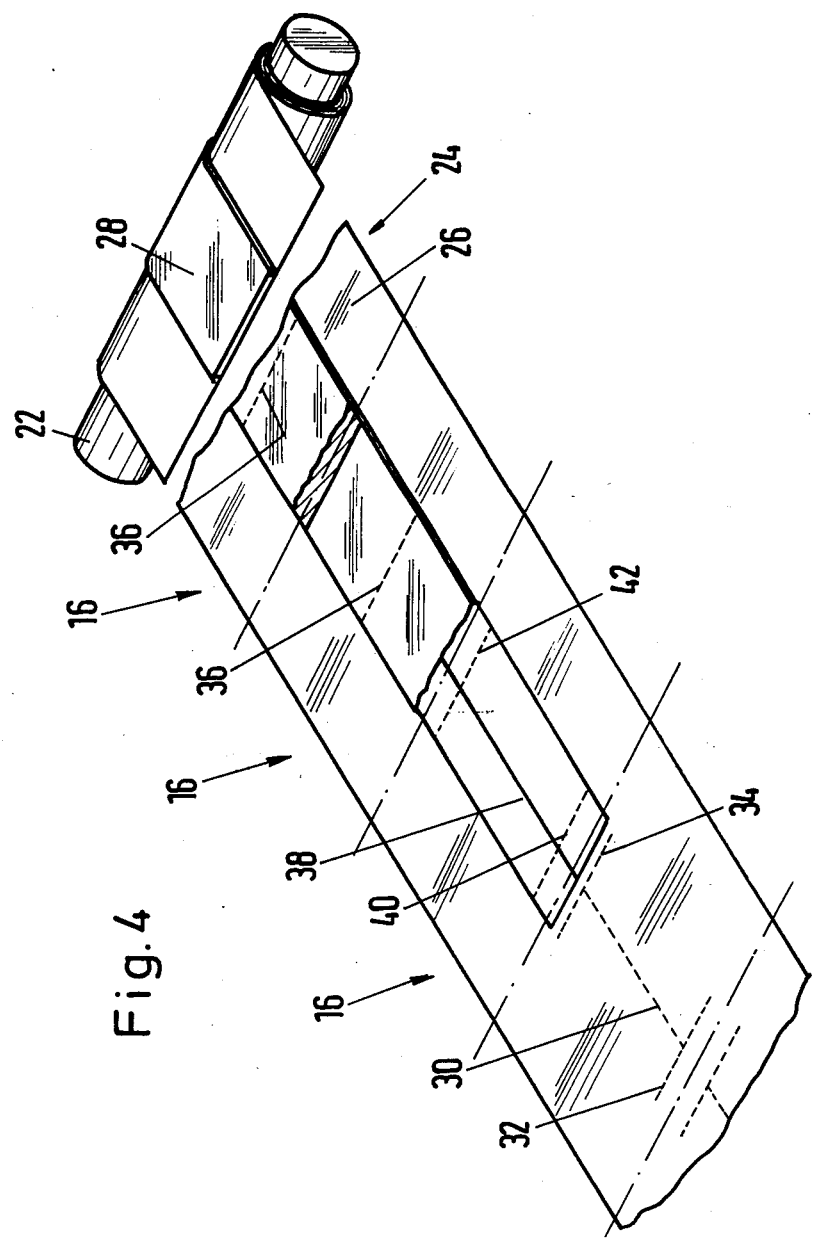

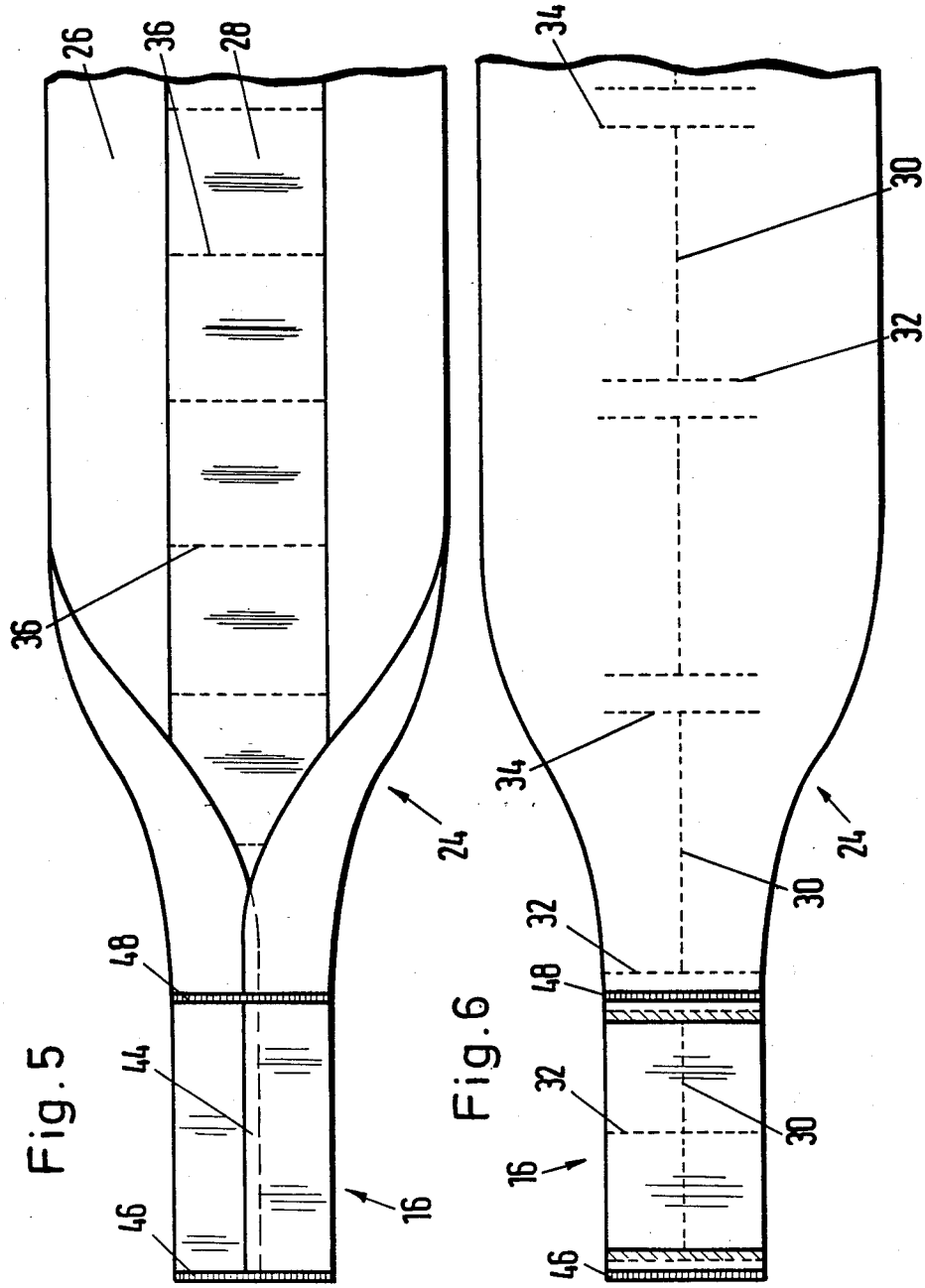

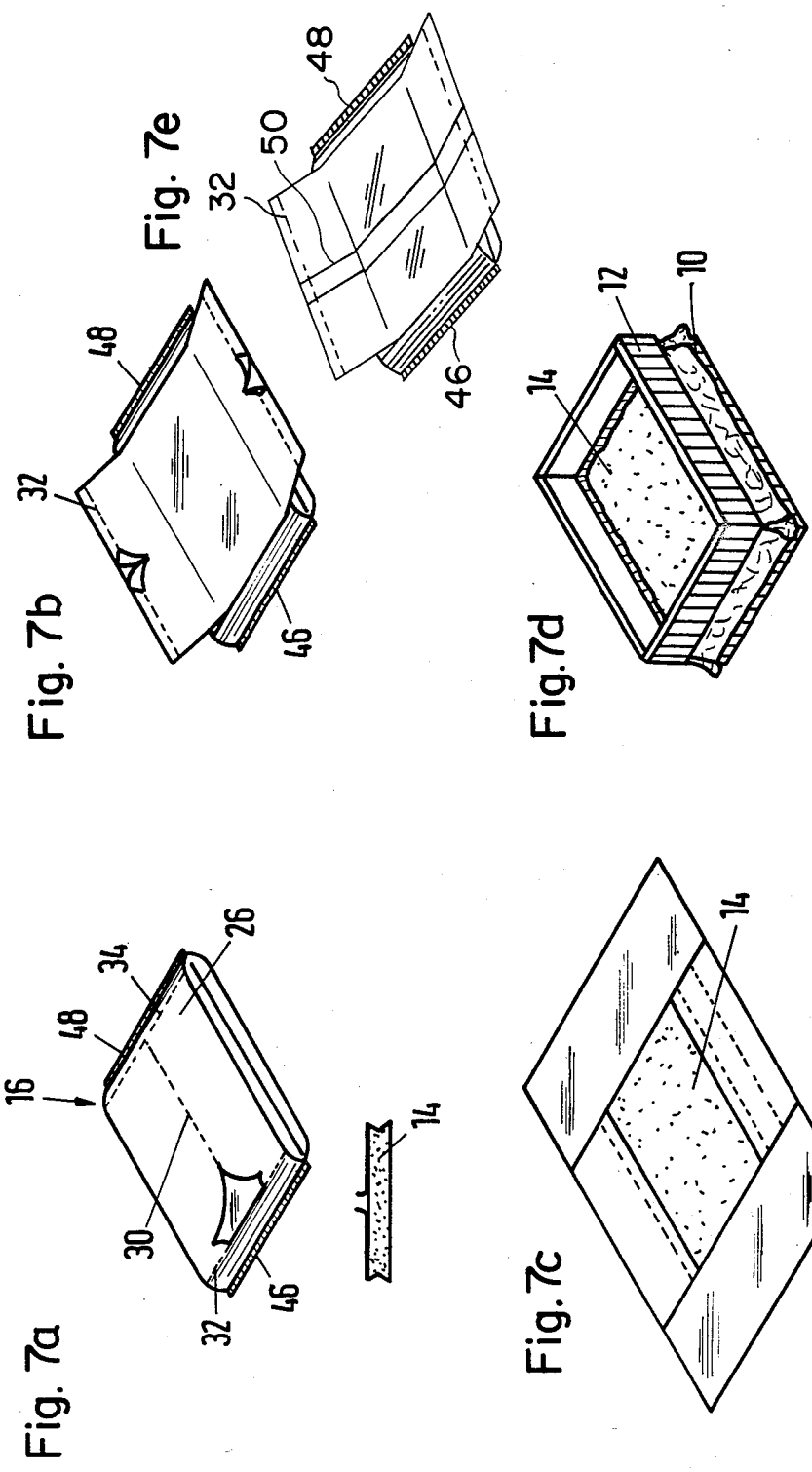

FOIL PACKAGE AND METHOD FOR PRODUCING SAME

The invention is related to a cat-toilet, having a lower part in the form of an upwardly open bowl and a replaceable bag filled with cat litter inserted into the lower part. The upper end part of the replaceable bag which after being inserted inserting into the lower part and opened is folded out for use. The bag can be folded together again, after use of the litter, by closing the bag at least preliminarily the bag is provided with an upper part which can be positioned on the lower part after having the end part of the bag folded out for temporarily covering the upper edge portion of the lower part and securing the folded out end part of the bag on the upper peripherial edge of the lower part.

As is well known, it is easy to make cats familiar with the use of placing their urine and droppings into a container intended for that purpose. Such containers, designated as cat-toilets, which in former times usually had been filled with sand, nowadays more and more are filled with a special porous, adsorbing and odor diminishing material, so-called cat-litter, as a preferred example being described in DE-A-No. 29 02 079.

A problem with such cat-toilets is that the cat-litter must be replaced at regular intervals. It is not hygienic simply to deposit the cat-toilet content into a waste-container or the like, since development of dust and odor cannot be avoided when doing so. Therefore it is desired to have the ability to replace cat-litter of such cat-toilets after use hygienically and without dust development.

U.S. Pat. No. 3,771,493 describes a cat-toilet of the aforementioned kind in which an upper part in ringform is put onto the lower part which has the form of a dish. A disadvantage of this well-known cat-toilet is that the bag itself has no shape stability, so that it is necessary to place the bag with relatively great diligence into the lower part in order to have a reliable fitting. Otherwise the danger exists that when folding out the upper bag part over the peripherical edge of the lower part cat-litter falls out of the bag. Similar cat-toilets are known from DE-A-No. 26 13 659 and U.S. Pat. No. 3,990,396, DE-A-No. 31 17 900 describes a double-bag for removal of droppings in the domestic pet care field which, after having been used, is again closed and thereupon disposed of. The aforementioned double-bag has a disadvantage of a rather complicated and sophisticated structure and therefore causes rather high manufacturing costs, with the further result of a great amount of material to be used and therefore of considerable material costs.

Therefore the invention is intended to create a cat-toilet of the aforementioned kind which can be produced economically. Furthermore the invention makes it possible to hygienically, reliably and simply handle the cat-toilet as well when starting use thereof as well as when removing it. In particular the invention provides a bag, especially useful in connection with such a cat-toilet, which can be filled with cat-litter. The manufacturing of such a bag being realizable automatically and with low costs with the bag being fillable with pourable material of different kinds. Furthermore an object of the invention is to create a foil-packaging as well as a method of manufacturing the aforementioned kind, which guarantee the solution of the aforementioned task.

According to the invention a cat-toilet is proposed which is characterized in that the lower part essentially has the form of a rectangular case open at its upper side, that the upper part has the form of a substantially rectangular frame, and the bag has the form of a flat parallelepiped, the outer dimension of which corresponds substantially to the inner dimension of the lower part.

As an alternative thereto it can be provided that the lower part has the form of a dish and the upper part has the form of a ring, that the bottom of the bag consists of a semi-rigid material shaped to correspond to the bottom of the lower part, and that the bottom of the bag is provided with a stabilizing surrounding peripheral strip.

Furthermore the invention proposes that the bag is sealed by means of a foil or the like covering the peripheral strip.

Furthermore, the invention proposes that the upper end portion of the bag is folded back and is provided with a closing cord positioned in the back-fold.

In order to solve the aforementioned task a foil-packaging of the aforementioned kind is proposed which, according to the invention, is characterized in that the bag is provided with an outer hull in the form of a flat foil hose which is closed by heat-sealing or the like at two distant longitudinal ends on one side and along a narrow connecting area extending from one end to the other across its lower side. On the upper side of the outer hull opposite the connection area there is provided a longitudinal perforation extending essentially from one longitudinal end to the other longitudinal end in parallel to the connection area and ending at a distance from the respective cross sealing seam. In addition two cross perforations are provided parallel to and close to the cross sealing seams which are connected with the longitudinal perforation in the form of a "T". The upper part of the outer hull is provided with the longitudinal perforation and the cross perforations and is also provided with a flat inner hose consisting of foil material or the like which is connected with its ends at the longitudinal ends of the outer hull within the cross sealing seams. This inner hose and has a joining line parallel to the longitudinal perforation of the upper part of the outer hull along which the material of the inner hose is connected with the outer hull. Furthermore within the layer of material adjacent to the outer hull is provided with a joining line of two cross perforations corresponding essentially to the cross perforations of the outer hull. The inner hose also has, in the layer of material distant from the outer hull, a central perforation parallel to the cross perforation lines.

It can also be provided that the two layers of the inner hose are connected with each other in an essentially planar manner by a peel-off-adhesive joint.

Finally the invention proposes a method of manufacture which, according to the invention, is characterized in that a foil band is drawn from a supply roll, the foil band being provided on one side with the internal hose and being provided like the internal hose with the respective perforations. The foil band is provided with the respective sealing seams to produce a bag and the bag is filled with the pourable material. Finally, by simultaneously cutting and sealing the final filled bag is produced.

The cat-toilet according to the invention can not only be produced and manufactured with low costs, because the bags used for it, preferably being completely made from plastic material, can simply be filled with cat-litter and brought to the end-user without any dust problem, but also the cat-toilet after having been used gives the possibility of a reliable, hygienic removal by provisionally closing the respective bag, in a preferred embodiment by using a closing cord, and thereupon can be simply put into a garbage container or the like. For the user therefore it is no longer necessary to handle in a troublesome manner loose cat-litter as in the past.

Of course, the bag proposed by the invention is not only useful for use in connection with a cat-toilet according to the invention, rather the inventive idea quite generally comprises the method of using such a bag for foil-packaging particularly for porouble material, i.e. for use in connection with other kinds of pet or animal litter, pet food or the like.

Further features and advantages of the invention can be derived from the following description in which preferred examples are explained in detail in relation to the schematic drawing. The latter one shows:

FIG. 1 is first embodiment of a cat-toilet according to the invention in perspective side view from side/above, lower part, upper part and (opened) bag being shown in exploded view;

FIG. 4 is a foil band being drawn from a supply roll for producing another embodiment of a cat-toilet according to the invention in perspective view;

FIG. 5 is the foil band of FIG. 4 from above during the manufacturing of a bag;

FIG. 6 is the foil band of FIG. 5 from above from the opposed side; and

FIG. 7 is in the detailed views of (a) to (e) the method of placing a bag in the embodiment of the cat-toilets according to FIGS. 4–6 into the lower part as well as the placing of the upper part after opening the bag in different steps of using.

Figure 2:
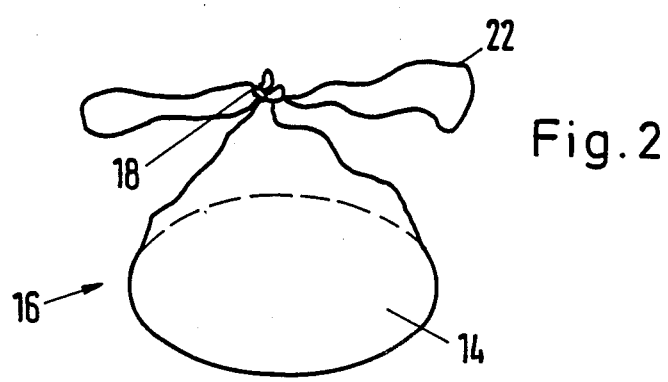
FIG. 2 is the bag of the cat-toilet of FIG. 1, closed for exchange.

FIG. 1 shows, the cat-toilet in the embodiment explained there having a lower part 10, an upper part 12 and a bag 16 for cat litter 14. In order to use the cat-toilet the bag 16, the bottom of which consists of a semi-rigid material shaped in accordance with the shape of the bottom of the lower part 10, is placed into the lower part 10, here being shaped in the form of a circular dish. An upper end part 18 of the bag 16 is folded around the upper edge of the lower part 10 in such a manner that the interior wall of the dish-like lower part 10 is completely covered by the bag material, such as plastic foil. Thereupon the ring-like upper part 12 is placed on the upper edge of the lower part 10 which is covered by the upper end part 18 of the bag 16, whereby the upper end part 18 of the bag 16 is covered and secured.

To replace the cat litter after having been made dirty by several uses by the cat, the upper part 12 is taken from the lower part 10 on which it has a tight fitting with the material of the bag 16. The upper end part 18 of the bag 16 is taken from the upper edge of the lower part 10 and is closed by pulling at a closing cord 22 being positioned in a back-fold of the upper end part 18 of the bag 16. Thereupon the bag 16 containing the cat litter 14 shown in FIG. 2 can be simply disposed of.

Figure 3:
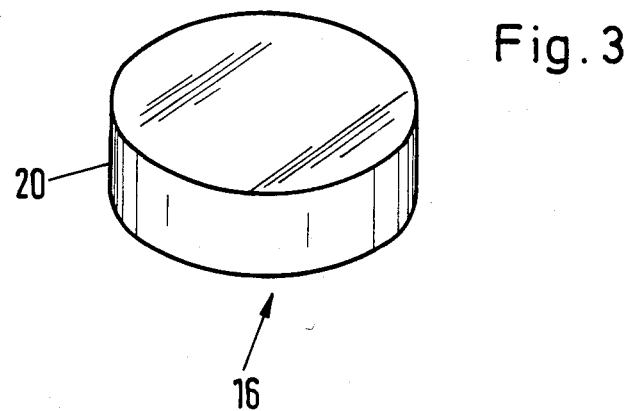
FIG. 3 is a bag filled with cat-litter for the cat-toilet according to the embodiment of FIGS. 1 to 3.

Thereupon a new bag is prepared to be placed into the cat-toilet. FIG. 3 shows such a bag 16 still being packaged which is enclosed by a ring-like peripheral strip 20 which guarantees the necessary strength for handling purposes, particularly for distribution, too. This peripheral strip 20 enclosing the bag with the fresh cat litter 14 therein is on all sides by a plastic foil, by which means the content of the bag is particularly protected against the penetration by moisture. Before placing the bag 16 with a fresh cat litter 14 the foil and the peripheral edge 20 are removed, the bag 16 is erected (FIG. 1), and the cat toilet is composed in the aforementioned manner.

Using the cat-toilet according to the invention as shown in FIGS. 1 to 3, and as described above, allows a simple and hygienic replacing of the dirty cat litter 14, the single bags 16 being to easy handle in a packaging suitable for distribution. An even improved manner can be achieved with the embodiment of the invention shown in FIGS. 4 to 7. FIG. 4 for that purpose shows a two-part foil band 24 rolling from a supply-roll 22. The foil band 24 carries, in this "band"-state, in a planar folded-up position, material for an outer hull 26 as well as for an inner hose 28. Both the outer hull 26 and the inner hose 28 consist of plastic foil of preferably different color. The outer hull 26 is provided with longitudinal perforations 30 as well as with cross perforations 32, 34 being joined thereto in T-form. The inner hose 28 at its side distant from the outer hull 26 is provided with a central perforation 36 and further is provided with a joining line 38 at its side adjacent to the outer hull 26. The areas of the inner hose 28 adjacent to the joining line 38 and being adjacent to each other are adhered to the outer hull 26 in a planar-like manner. This layer of material adjacent to the outer hull 26 of the inner hose 28 is provided with cross perforation lines 40, 42 corresponding to the cross perforations 32, 34 of the outer hull 26. Between the layer of the inner hose 28 adjacent to the outer hull 26 and the layer of the inner hose 28 there is provided a joining line 38, a cross perforation line 40, and 42 a peel-off-adhesive connection.

As can be seen from FIGS. 5 and 6, the foil band 24 by respective guiding is formed into a hose with a connecting area 44 being created by heat-sealing and lying in the drawing direction of the foil band 24. A cross sealing seam 46 is also made, whereupon the bag 16 created in this manner and being open to one side is filled with cat litter. After filling the bag it is provided with a further cross sealing seam 48 to close it. The cross sealing seams 46, 48 of course also connect the longitudinal ends of the inner hose 28 with each other. In FIG. 5 and FIG. 6 the bag made in this manner and being ready and closed is shown on the left-hand side, FIG. 6 showing the side of the bag being the upper side when using the bag, and having the longitudinal perforation 30 and the cross perforation 32 and 34.

FIG. 7 explains the method of using the bag according to the invention 16 as shown in FIGS. 4 to 7: In (a) one can see how the bag 16 filled with cat litter 14 is first of all opened in a manner such that the outer hull 26 along the longitudinal perforation 30 as well as along the cross perforations 32, 34 is opened at the upper side of the bag. When doing so, because of the adhesive connection, the respective layer of the inner hose 28 is also folded out, resulting finally in the configuration shown in FIG. 7(b) in which the outer hull 26 with the layer of the inner hose 28 adjacent thereto is folded out. Thereupon by using the central perforation 32 the other layer of the inner hose 28 is folded out, whereupon, as shown in FIG. 7(c), the cat litter 14 is open and uncovered for use. Figure 7(d) shows that the bag in this manner can be easily placed into a case-like lower part 10, the outer hull 26 and the inner hose 28, respectively, completely covering the upper peripheral edge of the case 10. A frame-like upper part 12, similar to the embodiment according to FIGS. 1 to 3, has the purpose to clamp the folded out part of the bag 16 securely onto the upper peripheral edge of the lower part 10. After use the upper part 12 is taken away, whereupon the bag easily, at least provisionally, can be closed by folding up the originally folded out end part portions of the bag 16 providing for a hygienic disposal.

In FIG. 7(e), which corresponds to FIG. 7(b), there is shown the embodiment of the invention where the two layers of the inner hose are connected to each other in an essentially planar manner by a peel-off adhesive strip 50.

The bag shown in FIGS. 4 to 7 can be manufactured particularly at low costs and simply in continuous manufacturing lines by using appropriately constructed foil packaging machines and, because of its economic manufacturing possibilities, has the advantage of optimum simplicity in its use.

The features disclosed in the foregoing description in the following claims and/or in the accompanying drawings may, both separately and in any combination thereof, be material for realizing the invention in diverse forms thereof.

What is claimed is:

1. A composite foil package to retain a pourable material such as cat litter or the like comprising, an outer hull and an inner lining sealed initially to provide an interior space to retain said pourable material, the outer hull and inner lining provided with a longitudinal perforation extending essentially from one longitudinal end to the other and lateral parallel perforations at each end of said longitudinal perforation whereby said outer hull and inner lining may be folded outwardly after release of said longitudinal and lateral perforations, said inner lining provided with a perforation approximately midway between said lateral parallel perforations and being parallel thereto whereby when said inner lining is folded outwardly after release of said inner lining perforation said pourable material is exposed for use.

2. A composite foil packaging according to claim 1 wherein the two layers of the inner lining are connected to each other in an essentially planar manner by a peel-off adhesive joint.

3. A method of manufacturing a composite foil package filled with a pourable material such as cat litter or the like comprising, drawing a composite foil band comprising an inner lining and an outer hull from a supply roll, providing on one side of said composite foil band, at spaced locations thereon, parting lines so that each inner lining and outer hull may be opened in subsequent use, heat sealing across said band at one end, filling the interior of said composite foil band with said pourable material and then heat sealing the other end of said band to enclose said pourable material and separating said band at each heat sealed location to provide a separate foil package filled with said pourable material.

* * * * *